United States Patent [19]

McLaughlin

[11] 4,201,894

[45] May 6, 1980

[54] ARRANGEMENT FOR CONVERSION OF RANDOM TO FIXED DATA CHANNEL FORMAT

[75] Inventor: Donald W. McLaughlin, Naperville, Ill.

[73] Assignee: GTE Automatic Electric Laboratories Incorporated, Northlake, Ill.

[21] Appl. No.: 946,891

[22] Filed: Sep. 28, 1978

[51] Int. Cl.² .......................................... H04Q 11/04
[52] U.S. Cl. ..................................................... 370/58
[58] Field of Search ....... 179/15 AT, 15 AQ, 15 AL, 179/18 FC

[56] References Cited

U.S. PATENT DOCUMENTS

| | | | |
|---|---|---|---|
| 3,492,430 | 1/1970 | Vigliante | 179/15 AT |
| 3,890,469 | 6/1975 | Kelly et al. | 179/15 AT |
| 3,914,559 | 10/1975 | Knollman | 179/15 AT |
| 3,916,118 | 10/1975 | O'Neill | 179/15 AT |
| 4,001,514 | 1/1977 | Wurst | 179/15 AT |
| 4,007,338 | 2/1977 | McLaughlin | 179/18 BC |

*Primary Examiner*—Douglas W. Olms
*Attorney, Agent, or Firm*—Robert J. Black; Charles A. Doktycz

[57] ABSTRACT

A private automatic branch exchange employing time division switching of digital signals, with provision for interfacing a fixed format data channel source to the randomly assigned channel allocation of the exchange. This is accomplished via channel buffering and channel address conversion under control of the branch exchange clock system.

5 Claims, 7 Drawing Figures

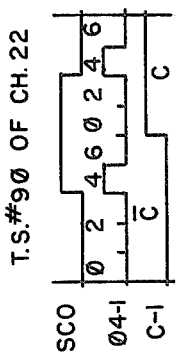
FIG. 5
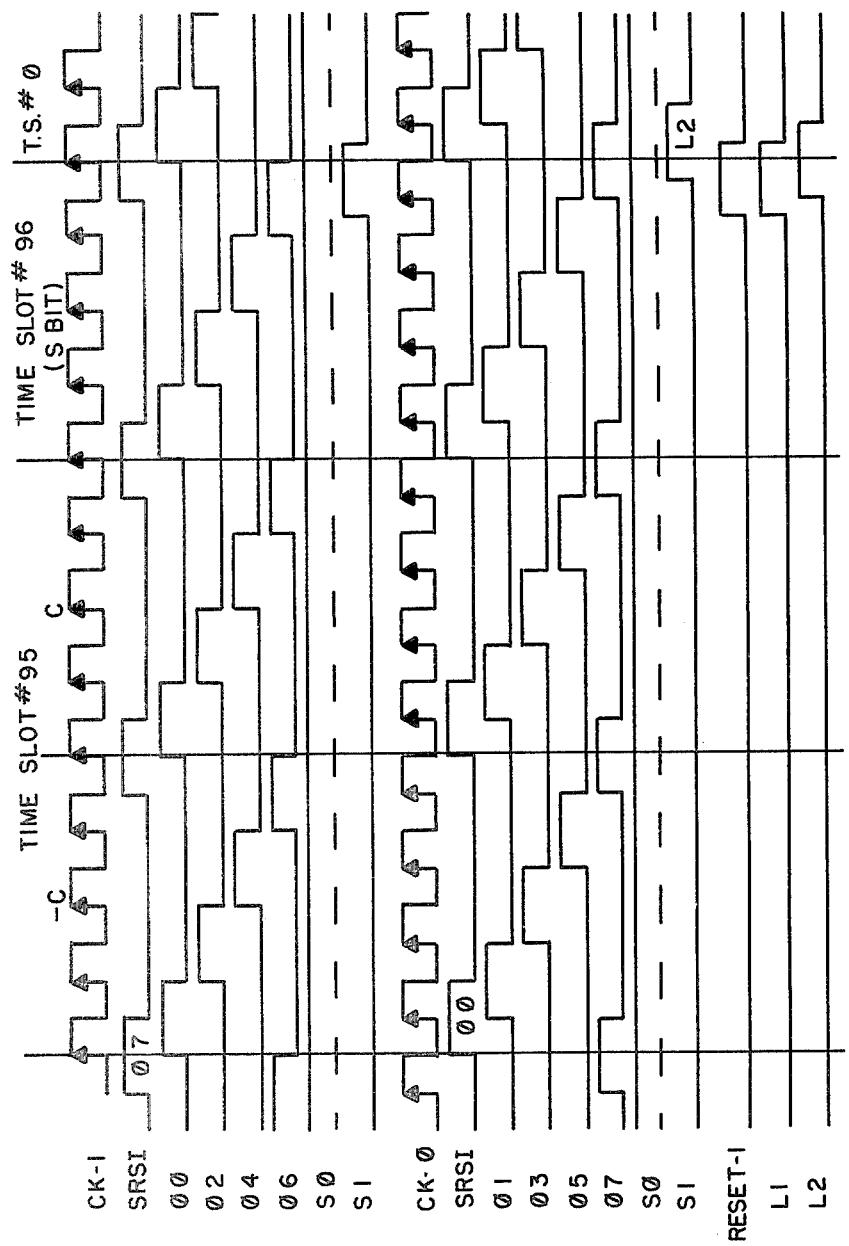
FIG. 6
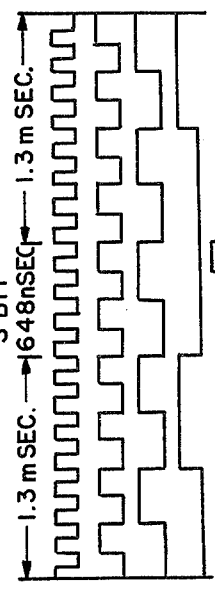
FIG. 4
FIG. 3

ARRANGEMENT FOR CONVERSION OF RANDOM TO FIXED DATA CHANNEL FORMAT

BACKGROUND OF THE INVENTION

1. Field of the Invention

The present invention pertains to private automatic branch exchange telephone systems and more particularly to such systems employing time division multiplex (TDM) switching of digital signals with included provisions for interfacing a fixed format of a source such as a T1 carrier span line with the random format of an exchange switching system.

2. Description of the Prior Art

Private automatic branch telephone exchanges function as centralized switching systems. Such systems provide connections between a number of locally connected telephone lines with associated telephone apparatus and one or more trunk circuits connecting the private automatic branch exchange to a distant central office.

Until very recent times private automatic branch exchanges (PABX's) have provided switching between lines and trunks on a space divided basis. That is to say, switches of either an electro-mechanical or electronic configuration have provided selective paths through the switching system to interconnect lines to each other or to trunk circuits serving the PABX. Generally, the signals transmitted through the PABX were of an analog nature. Where a line or a trunk circuit was employed digital techniques such as pulse code modulation (PCM) were employed. Interface circuitry was a necessity. Such circuitry provided analog to digital conversion and digital to analog conversion.

More recently a new generation of PABX systems employing time division switching have been provided. Some such systems as the "Dimension" PABX manufactured by Western Electric Company have provided time division switching of analog signals. Other more recent developments in PABX systems have provided time division switching of pulse code modulated signals. Systems of this type have been manufactured by GTE Automatic Electric Company and designated GTD 120, GTD 1000 and GTD 4600. In such systems as the GTD series, analog to digital and digital to analog interfaces have been provided between the lines and trunks and the time division switching system.

To effect greater economies in transmission equipment requirements, more extensive use has been made in recent years of digital transmission equipment. Of particular wide acceptance has been the so called T1 type carrier systems which employ pulse code modulation to provide a number of multiplexed signal paths over a single transmission facility. Such arrangements are currently in use primarily between telephone central offices. To date, little utilization of such economies has taken place in transmission facilities which connect central offices and private automatic branch exchanges. The state of the art and time division switching systems, employing pulse code modulated signals as the transmission format, are exemplified by such systems as the aforementioned GTD 120 the operation of which is described in U.S. Pat. No. 4,007,338 issued to D. W. McLaughlin on Feb. 8, 1977. The use of T1 lines using signalling of the D2 or D3 PCM type is discussed in an article "Second Generation Toll Quality PCM Carrier Terminal" by L. Dean Crawford in the April 1972 issue of the Automatic Electric Technical Journal. A channel bank unit of the type employed in usage as described above is manufactured by GTE Lenkurt Incorporated and designated 9002A channel bank.

Accordingly, it is the object of the present invention to provide switching facilities to directly interface conventional T1 carrier span lines with a fixed format channel allocation. These facilities are located in a private automatic branch exchange with an associated random allocation channel network.

SUMMARY OF THE INVENTION

The above objective is achieved via a one frame buffer in each direction. For the incoming call case, data is loaded using a sequential address counter which is synchronized with the incoming data stream. The data read out from the buffer is random. This data is the result of: detecting the address of the associated data word, before that word is required; delaying the address and then fetching the data via a read operation.

The write operation to the outgoing data buffer uses (this same address identity). The (identity) is further delayed to correspond to the data's occurrence at a later time. Then, the read from the buffer is sequential following a counter to output a sequential data stream. The heart of the invention is the shift register, which allows the identity received from the network channel memory, to be converted to the buffer address format. This buffer address format is saved, and used to allow the incoming T1 PCM buffer to be read as an address to the buffer. The outgoing T1 PCM buffer is also written into via the shift register output as an address to that buffer.

BRIEF DESCRIPTION OF THE DRAWINGS

The invention will now be described in more detail by way of example only, with reference to the accompanying drawings, wherein:

FIGS. 2, 3, 4, 5, 6 and 7 are pulse timing charts illustrating various clock and timing pulses of the system.

DESCRIPTION OF THE PREFERRED EMBODIMENT (FIG. 1)

Figure 1:
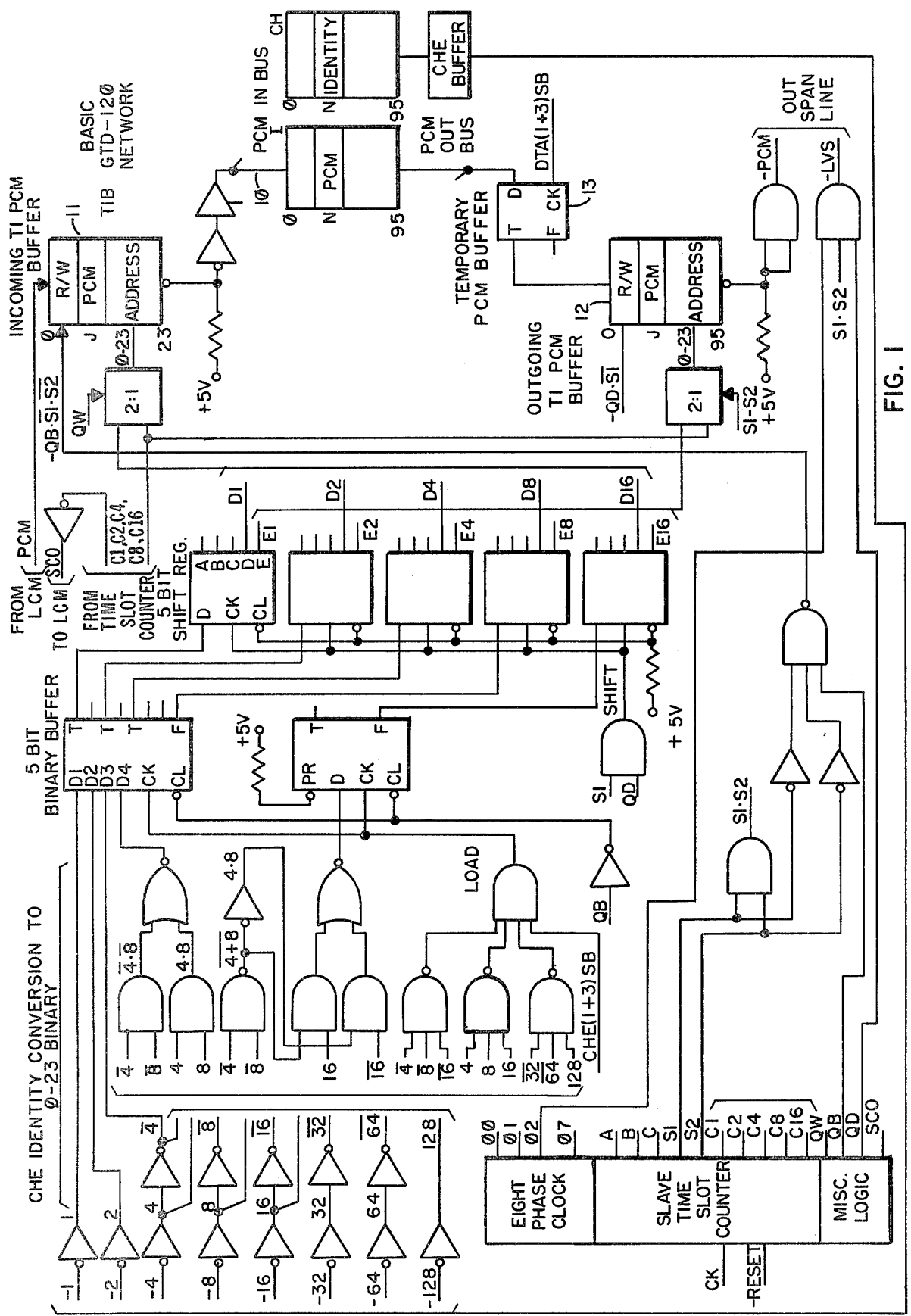
FIG. 1 comprises a schematic block diagram of a portion of the trunk interface of an electronic pulse code modulated switching exchange embodying the principles of the present invention.
Figure 2:
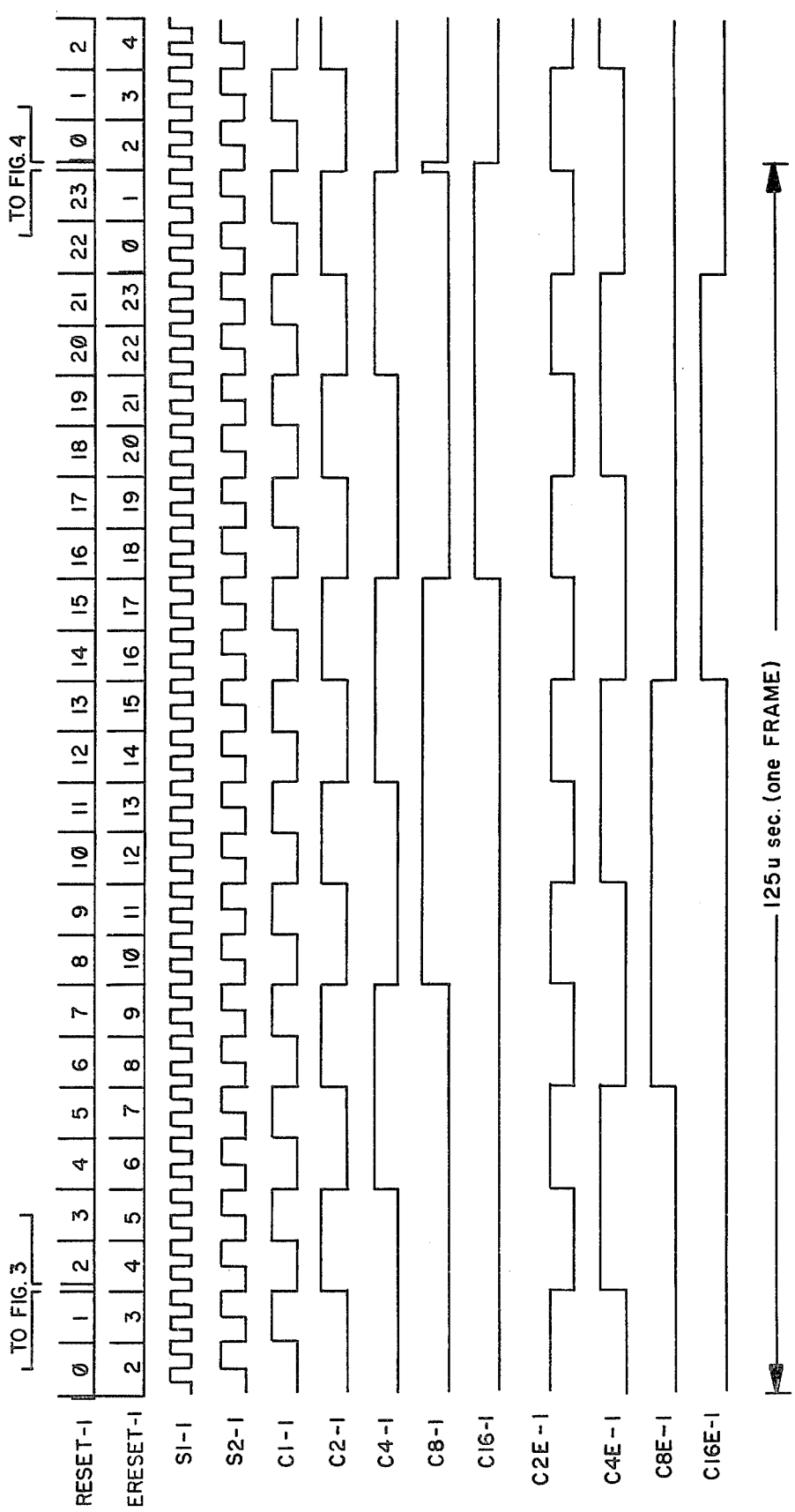
Figure 7:
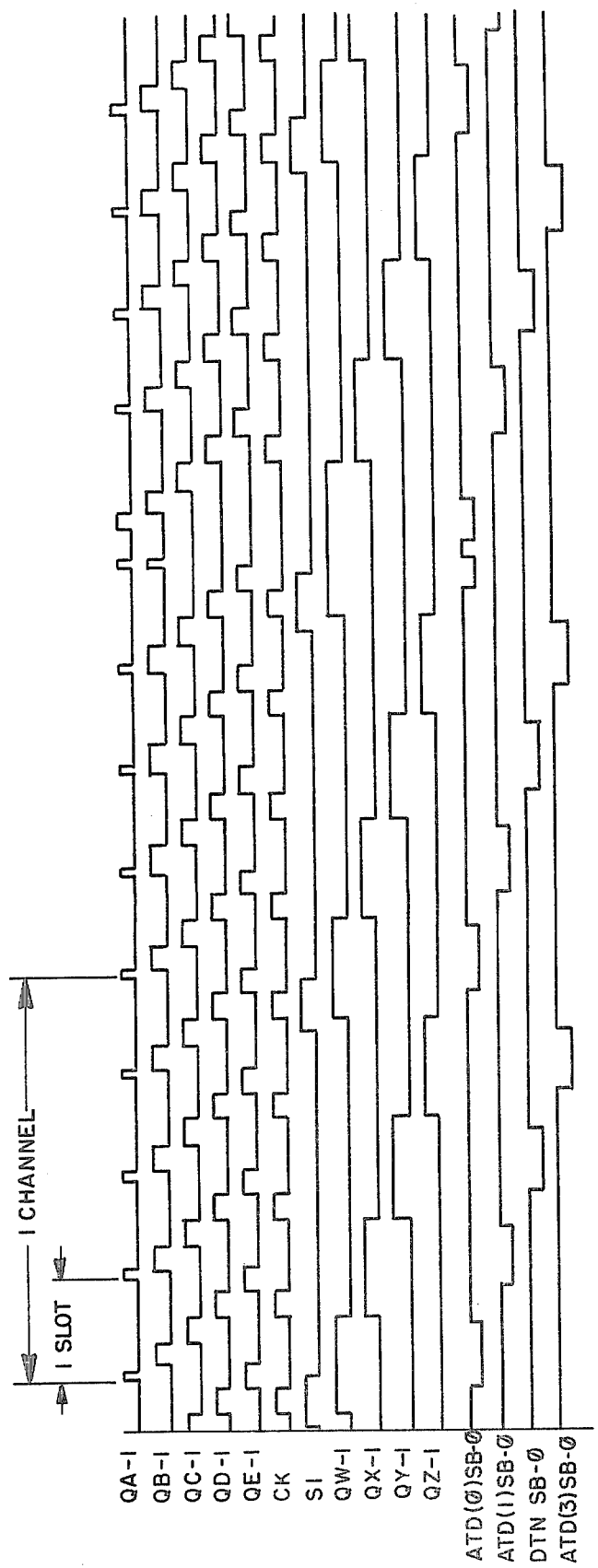

The GTD-120 network information memory I and channel memory CH are shown on the right with the channel enable buffer CHE output going to the left. These memories have some time slot N shown with the PCM contents in the information memory I and an address identity stored in the channel memory CH. The address identity will be read and loaded to the channel enable buffer CHE, two channels (eight time slots) before the PCM code associated with that identity must be present on the PCM IN BUS to be stored in the information memory I location N. One time slot later, the PCM contents will appear on the PCM OUT BUS 10 due to the network "time switch" operation.

The incoming T1 carrier PCM buffer 11 accepts 24 channels of PCM code every frame from a line compensation module of the carrier by requesting it to "send channel zero" (SC0) to synchronize that data to the time T1B slot counter as shown on chart of FIG. 5. This write operation is addressed by the time slot counter outputs C1, C2, C4, C8 and C16 via the steering gate controlled by signal QW, as shown on FIGS. 2, 3, 4 and 7. Signal $-QB.\overline{S1}.\overline{S2}$ occurs during QW to cause the buffer write operation.

Next, the outgoing T1 PCM buffer must read twenty-four channels of PCM every frame to be sent to the span interface. The signal "load voice samples" (−LVS) clocks this data into a buffer in the span interface circuit, every channel according to the condition LVS=QD.φ2.S1.S2. The read address also comes from the time slot counter C1, C2, C4, C8 and C16 signals via a steering gate controlled by signal S1.S2 from the time slot counter. This operation occurs every channel.

Then, the T1 span will send sequentially occurring PCM data to the T1B buffer 11 and receive sequentially occurring PCM data from the T1B buffer 12. The sequential operation corresponds to the time slot counter C1, C2, C4, C8 and C16 outputs which count from 0 to 23 in 5-bit binary code every frame.

However, the network operates from the channel memory CH which causes random buffer addresses to occur. This is because time slot N can have any identity associated with equipment of that time slot group. The digital trunk identities 132 through 143 will be in group 1 time slots and digital trunk identities 144 through 155 will be in group 3 time slots. These identities in total (i.e. 132 through 155) can occur in up to 48 possible time slots N. Further, each identity corresponds to an incoming and outgoing T1 PCM buffer location. Identity 132 will correspond to buffer location zero and identity 155 will correspond to buffer location 23. Then some location J of the buffer will be accessed in time slot N of a frame because of the corresponding identity being in location N of the channel memory CH. If that identity were in a location of some other time slot, it would be accessed in a different time of the frame, but still at location J of the buffer. The identity defines the location J of the buffer memory. The time slot N determines when the J location of the incoming T1 PCM buffer will be read to send PCM to the information memory I and the time at which the J location of the outgoing T1 PCM buffer will be written into from PCM coming out of the information memory I.

The identity is converted from the numbers 132 through 155 in the "CHE identity conversion to 0–23 binary" logic on the left of FIG. 1. This then is stored into a 5-bit binary buffer which is cleared every time slot by the QB signal after being transferred to a 5 bit shift register. The clear forces a count of 24 since 0 is a valid address. This is possible since the 8 and 16 flip-flops of the buffer, load inverted data and use the $\overline{Q}$ outputs. The clear operation forces the 8 and 16 address bits to be true. The shift register shifts on group 1 and 3 time slots or every other time slot by signal QD.S1. Four shifts then give a delay of 2 channels and result in the data being on the "D" output of the shift register. Then, this is used to read the incoming T1 PCM buffer 11 so the PCM data of location J can be sent to the information memory I to be loaded into its location N. After one more shift, the "E" output contains the data. The data is used to store its PCM data into location J of the outgoing T1 PCM buffer 12. The temporary PCM buffer 13 will shift on clock signal "DTA(1+3)SB" and, thus, holds the PCM for two time slots to coincide with the "E" shift register output. The write signal $-QD.\overline{S1}$ loads the contents of the temporary PCM buffer 13 into the outgoing T1 PCM buffer 12.

The loading of the 5-bit binary buffer is in response to the signal "load". This occurs only during group 1 or 3 time slots by signal "CHE(1+3)SB" and also, only if an identity 132 through 155 exists. The logic condition $128.\overline{64}.\overline{32} \,\overline{(16.8.4)} \cdot \overline{(16.8.4)}$ is "anded" to give the load signal. The logic to convert 132–155 in 8-bit binary to 0–23 into 5-bit binary is a result of six transformations:

|    | 128 | 64 | 32 | 16 | 8 | 4 | 2 | 1 | 16 | 8 | 4 | 2 | 1 |
|----|-----|----|----|----|----|----|----|----|----|----|----|----|----|
| a. | 1 | 0 | 0 | 0 | 0 | 1 | X | X | 0 | 0 | 0 | X | X |
| b. | 1 | 0 | 0 | 0 | 1 | 0 | X | X | 0 | 0 | 1 | X | X |
| c. | 1 | 0 | 0 | 0 | 1 | 1 | X | X | 0 | 1 | 0 | X | X |
| d. | 1 | 0 | 0 | 1 | 0 | 0 | X | X | 0 | 1 | 1 | X | X |
| e. | 1 | 0 | 0 | 1 | 0 | 1 | X | X | 1 | 0 | 0 | X | X |
| f. | 1 | 0 | 0 | 1 | 1 | 0 | X | X | 1 | 0 | 1 | X | x |

It can be seen that the 1 and 2 bits are just used directly and the bit 4 inverts. The eight bit inverts if bit 4 is false and stays the same if bit 4 is true. The 16 bit is the same except when both bit 4 and bit 8 are false. The resultant equations are:

$1 = 1, 2 = 2, 4 = \overline{4}$
$8 = 8.4 + \overline{8}.\overline{4},$
$16 = 16.\overline{(4+8)} + \overline{16}.\overline{(4.8)}$ Numerous modifications and variations of the present invention are possible in light of the above teachings. Therefore, the invention described herein may be practiced otherwise, but within the scope of the appended claims.

What is claimed is:

1. In a pulse code modulated time division communications switching system, wherein the number of terminations exceeds the number of available channel links and the channel links are allocated to the terminations on a random per call basis by generating a digital address of a particular termination during an allotted channel link time slot and having a central control and timing means for controlling the operations thereof; an arrangement for directly interfacing a T1 PCM carrier span comprising: a receiver means operative for generating at the output thereof a sequential stream of 24 channels of digital data in response to receipt of data from said carrier span; first buffer means for temporarily storing said digital data for each of said 24 channels; decoder means operated in response to said central control means to receive said digital address and producing at the output thereof a second address corresponding to one of said 24 channels of said first buffer means; and read out means responsive to said decoder means output for causing the reading out of said buffer of the corresponding channel data.

2. In a pulse code modulated communications system as claimed in claim 1, further including; a second buffer means operated to receive a decoded address from said decoder means to temporarily store outgoing digital data for each of said 24 channels prior to outputing to said carrier span.

3. In a pulse code modulated communications system as claimed in claim 1, wherein: said central control outputs said digital address to said decoder means a number of channels before it is needed for the readout of said first buffer and said arrangement further includes, a plural stage shift register operatively connected between said decoder output and said first buffer, to delay said decoded address to correspond to the proper channel.

4. In a pulse code modulated time division communications switching system as claimed in claim 3, wherein: said second buffer means is connected to said shift register output for the control of its readout.

5. In a pulse code modulated time division communications switching system as claimed in claim 4, wherein: said shift register is connected to and operated by said timing means to shift its stored address.

* * * * *